(12) United States Patent
Hand et al.

(10) Patent No.: US 8,097,106 B2
(45) Date of Patent: Jan. 17, 2012

(54) METHOD FOR FABRICATING COMPOSITE STRUCTURES HAVING REINFORCED EDGE BONDED JOINTS

(75) Inventors: Michael L. Hand, Huntington Beach, CA (US); Leanne L. Lehman, Aliso Viejo, CA (US); Miklos P. Petervary, Westminster, CA (US)

(73) Assignee: The Boeing Company, Chicago, IL (US)

( * ) Notice: Subject to any disclaimer, the term of this patent is extended or adjusted under 35 U.S.C. 154(b) by 675 days.

(21) Appl. No.: 11/770,157

(22) Filed: Jun. 28, 2007

(65) Prior Publication Data

US 2009/0005232 A1  Jan. 1, 2009

(51) Int. Cl.
*C03B 29/00* (2006.01)
*B32B 7/08* (2006.01)
*C04B 33/34* (2006.01)
*B29C 65/00* (2006.01)

(52) U.S. Cl. ............... 156/89.11; 156/89.27; 156/93; 156/249; 156/252; 156/285; 156/290; 156/292; 156/308.4; 156/309.9; 428/116

(58) Field of Classification Search ............ 156/89.11, 156/89.27, 93, 249, 252, 285, 290, 292, 297, 156/308.4, 309.9; 428/116
See application file for complete search history.

(56) References Cited

U.S. PATENT DOCUMENTS

| 3,451,181 | A | * | 6/1969 | Neuschotz | 52/787.1 |
| 4,054,477 | A | * | 10/1977 | Curran | 156/197 |
| 5,137,931 | A | * | 8/1992 | Okumura et al. | 521/109.1 |
| 5,354,527 | A | * | 10/1994 | Frechette et al. | 264/639 |
| 5,415,715 | A | * | 5/1995 | Delage et al. | 156/197 |
| 5,518,796 | A | * | 5/1996 | Tsotsis | 428/116 |
| 5,667,867 | A | * | 9/1997 | Meier et al. | 428/116 |
| 5,944,935 | A | * | 8/1999 | Zukas et al. | 156/285 |
| 6,969,546 | B2 | | 11/2005 | DiChiara, Jr. | |

* cited by examiner

*Primary Examiner* — Philip Tucker
*Assistant Examiner* — Alex Efta
(74) *Attorney, Agent, or Firm* — Tung & Associates

(57) ABSTRACT

A ceramic matrix composite structure has a reinforced core for carrying loads. The core includes a web connected between the facesheets by edge bonded joints for transmitting compressive, tensile and shear loads. The edge bonded joints are laterally reinforced by bridging members bonded to the facesheets, on opposite sides of the webs The bridging members may comprise low density, high temperature rigid foam.

13 Claims, 6 Drawing Sheets ical field

This disclosure generally relates to composite structures, and deals more particularly with a ceramic matrix composite sandwich, and rib stiffened structures having reinforced edge bonded joints.

BACKGROUND

Edge bonding is widely employed in composite structures, such as honeycomb core sandwich panels or grid stiffened shells suitable for various applications, such as those used in the aerospace industry. In moderate and lower temperature range applications, the elements of the structures may be formed from polymeric matrix composites reinforced with various types of fibers. Core elements or stiffeners are joined to facesheets or skins using edge bonds. For example, as shown in FIG. 1, a polymeric matrix composite structure 20 includes spaced facesheets 22, 24 joined together by web-like stiffeners 26 that are edge bonded at 27 to the facesheets 22, 24. Since the stiffeners 26 are required to transmit compressive, tensile and shear loads, it may be necessary to reinforce the edge bonded joints 27 using fillets 28 which may comprise a polymeric adhesive. The fillets 28 adhere to both the facesheets 22, 24 and the sides of the stiffeners 26, covering the bond line (not shown) at the edge bonded joints 27. The structure 20 shown in FIG. 1 is well suited for forming honeycomb sandwich structures that distribute loads to peripheral members or carry in-plane loads while resisting buckling. Moreover these structures are relatively economical to fabricate, due in part to the simplicity of the edge bonded joints 27.

In higher temperature applications however, such as those in which parts are subjected to high temperature exhaust gasses and/or atmospheric friction during re-entry of space vehicles, the polymeric-based construction shown in FIG. 1 is not suitable, due to the fact that polymeric matrix materials lose strength and stiffness at high temperatures.

In higher temperature applications, such as the aerospace applications mentioned above, ceramic matrix composites (CMC) are commonly used because they are better suited to withstanding higher operating temperatures. Typically, CMC's comprise multiple layers of fiber fabric impregnated with a matrix material, often referred to as a prepreg, although ceramic fibers are available in a variety of other forms, including tape, tows and three dimensional woven preforms. Several methods may be used to fabricate CMC's, including for example, hand-layup, filament winding, tow placement and dry fiber preforms with vacuum assisted matrix infusion. The construction shown in FIG. 1 however, is not directly reproducible using CMC materials because the production of CMC's involves a sintering step in which unfilled ceramic matrix material, such as that in fillets, tends to sublimate. Prior attempts to make honeycomb sandwich structures using CMC's have left a ceramic matrix bondline only in the small area where the edges of the honeycomb form a faying surface with the adjacent facesheets. The resulting bond is may be weak, even at very low loads.

Accordingly, there is a need for CMC structures employing edge bonded joints having improved joint strength in order to carry heavier loads. There is also a need for CMC structures having edge bonded joints that can be easily and economically fabricated. The disclosed embodiments are intended to satisfy these needs.

SUMMARY

Embodiments of the disclosure provide CMC structures having reinforced, edge bonded joints capable of carrying tensile, compressive and shear loads. CMC constructions having edge bonded core elements are made possible by reinforcing the edge bonded joints between the core elements and the facesheets of the sandwich construction. The edge bonded joints are reinforced by bridge members that cover the bond lines and abut opposite sides of the core elements in order to improve the resistance of the core elements to shear forces. The bridge members may be economically manufactured by depositing a continuous layer of rigid foam on a facesheet and then forcing edges of the core elements through the foam layer.

According to one embodiment of the disclosure, a ceramic composite structure is provided comprising: at least one ceramic matrix composite sheet; a stiffener extending transverse to the sheet and having at least one edge; an edge bonded joint between edge of the sheet; and bridging members on opposite sides of the stiffener for reinforcing the edge bonded joint. The bridging members abut opposite sides of the stiffener and cover bond lines between the stiffener and the facesheet. The sheet and the stiffener may comprise a ceramic matrix composite. The bridging members may be formed of rigid foam having a density less than the density of the stiffener. The bridging members may be a ceramic foam or a sintered ceramic fiber felt. Spacers of low density or fugitive materials may be placed in the volume between bridging members.

According to another disclosed embodiment, a ceramic matrix composite structure is provided, comprising: first and second spaced apart ceramic matrix composite sheets; a core sandwiched between the first and second composite sheets, including a rigid web extending transverse to the first and second sheets and having opposite ends respectively bonded to the first and second sheets; and, first and second reinforcement layers abutting opposite sides of the web for reinforcing the bonds between the opposite ends of the webs and the first and second composite sheets. The composite sheets may include multiple plies of fiber fabric held in a ceramic matrix. The reinforcement layers may include a rigid ceramic foam having a density less than the density of the web. Each of the first and second reinforcement layers may include a bridging member having a bottom bonded to a corresponding one of the facesheets and a side abutting one of the opposite sides of the web.

According to one disclosed method embodiment, a ceramic matrix composite structure may be formed by the steps comprising: forming first and second layers of bridging material; forcing a first edge of a web through the first layer of bridging material; forcing a second opposite edge of the web through the second layer of bridging material; applying first and second facesheets to opposite sides of the web; and bonding the first and second edges respectively to the first and second facesheets. The method may further comprise bonding the first and second layers of bridging material respectively to the first and second facesheets. The bonding may include bonding the first and second layers of bridging material to the first and second facesheets substantially concurrently.

According to another method embodiment, a ceramic matrix composite structure may be fabricated by the steps comprising: forming first and second layers of bridging material; forcing a first edge of a web through the first layer of bridging material; forcing a second opposite edge of the web through the second layer of bridging material; applying first and second facesheets to opposite sides of the web; and bonding the first and second edges respectively to the first and second facesheets.

According to further method embodiment, a ceramic matrix composite structure may be fabricated by the steps comprising: placing a reinforcing core in a layer of foam; forming a first layer of bridging material on a first side of the foam layer bridging the sides of the core; bonding a first facesheet to the first side of the foam layer; forming a second layer of bridging material on a second side of the foam layer bridging the sides of the core; bonding a second facesheet to a second side of the foam layer.

According to still another method embodiment, a ceramic matrix composite structure may be fabricated by the steps comprising: forming structural stiffeners; forming bridging members for laterally reinforcing the stiffeners; forcing the stiffeners through the bridging members; laying up a facesheet; and, bonding the facesheet to the combination of the stiffeners and the bridging members.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

As will be discussed below in more detail, embodiments of the disclosure provide reinforcement of edge bonded joints in a variety of CMC structures. Edge bonding is widely employed in composite structures, such as honeycomb core sandwich panels or grid stiffened shells. These CMC structures typically comprise the following basic structural elements: (1) a shell element which may comprise the facesheet of a sandwich structure, the outer skin of a vehicle, the web of a stiffened panel, etc., (2) stiffeners, for example the core of a sandwich structure, ribs supporting the skin of a vehicle, or flanges stabilizing the web of a stiffened panel, and (3) bridging elements, which reinforce edge bonded joints between (1) and (2) above, and provide an alternate load paths between shell and stiffener outside the edge bond faying surface between the two.

Figure 1:
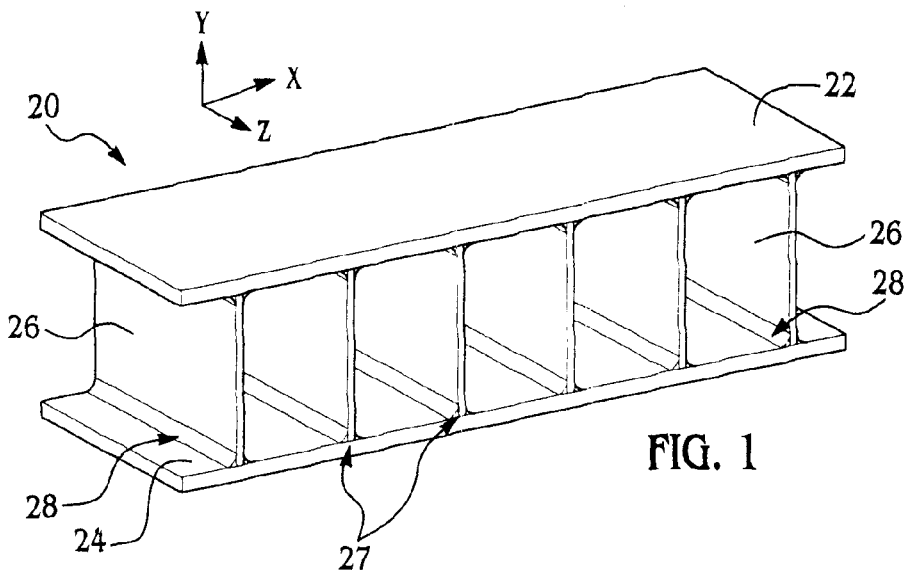
FIG. 1 is a perspective illustration of a prior art polymeric matrix composite structure employing fillets for reinforcing edge bonded joints.
Figure 2:
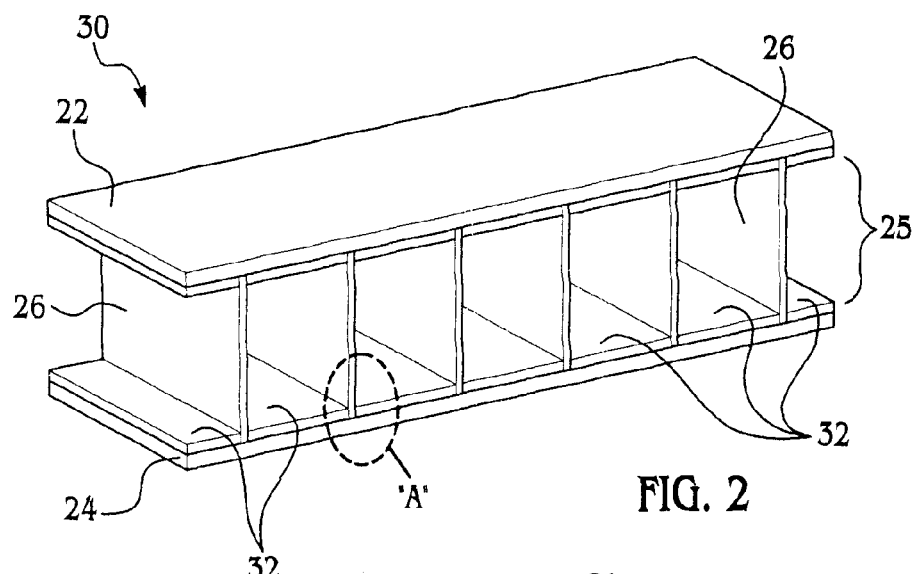
FIG. 2 is a perspective illustration of a CMC structure having reinforced core stiffening members according to an embodiment of the disclosure.
Figure 3:
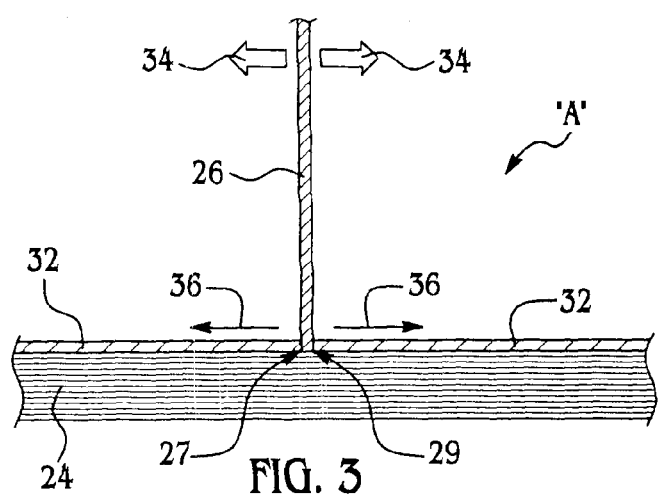
FIG. 3 is a sectional view of the area designated as "A" in FIG. 2.

Referring first to FIGS. 2 and 3, a CMC structure 30 broadly comprises a pair of spaced apart facesheets 22, 24 between which there is sandwiched a core 25. Each of the facesheets 22, 24 may comprise multiple layers or plies of ceramic fiber material impregnated with a matrix material or "prepreg". As used herein, the term "ceramic" refers to the conventionally known and commercially available ceramic materials that are fabricated in a fiber form. The ceramic fibers may include, but are not limited to, silicon carbide, silica, TYRANNO®, alumina, aluminoborosilicate, silicon nitride, silicon boride, silicon boronitride, and similar materials.

Figure 8:
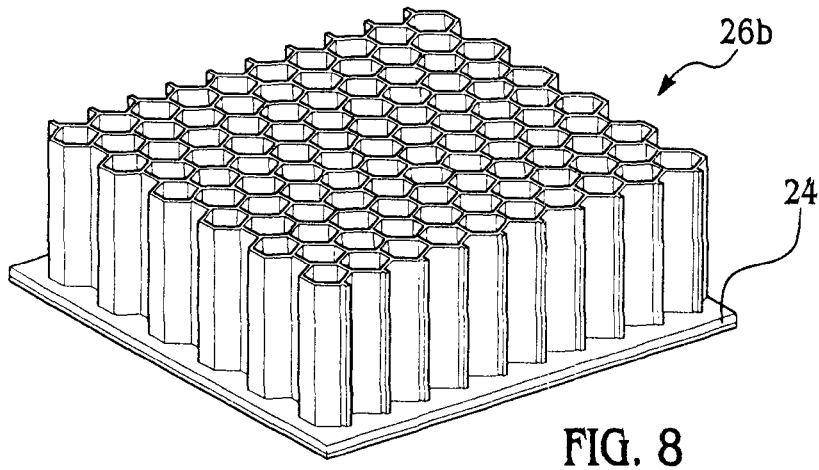
FIG. 8 is a perspective illustration of a honeycomb-type core.

In the example illustrated in FIGS. 2 and 3, the core 25 includes a plurality of spaced webs 26, which have their opposite edges "edge bonded" at 27 to the facesheets 22, 24 using commercially available, high temperature adhesives. The webs 26 extend substantially orthogonal to the facesheets 22, 24 and function to transfer compressive, tensile and/or shear loads between facesheets 22, 24. In the illustrated example, the webs 26 forming the core 25 are shown as parallel, straight walls; however the core 25 comprise other configurations. For example, as shown in FIG. 8, the core 25 may comprise a honeycomb structure 26b, which also acts as a spacer during the manufacturing process to hold the bridging members 32 against the facesheets 22, 24.

As mentioned above, the webs 26 may transfer compressive, tensile and/or shear loads between the facesheets 22, 24. For example, as shown in FIG. 3, shear loads on facesheet 22 indicated by the arrows 34 are transmitted through the web 26 to facesheet 24, as indicated by the arrows 36. In accordance with one embodiment of the disclosure, the edge bonded joints 27 are laterally reinforced by bridging members 32 that are bonded to the facesheets 22, 24, and abut opposite sides of each end of the web 26. The bridging members 32 are placed in the corners between the web 26 and the facesheets 22, 24 so as to cover the bond lines 29 (see FIG. 3) between the webs 26 and the facesheets 22, 24 at the joints 27.

The thickness of the bridging members 32 will depend on the requirements of the particular application, and the strength of the material forming the bridging members 32. Generally, the bridging members 32 should have a thickness sufficient to reinforce the web 26 enough to transmit the desired level of shear force to facesheets 22, 24. In the embodiment shown in FIGS. 2 and 3, the bridging members 32 are rectangular in shape, however other shapes are possible, and the particular geometry will depend upon the shape of the webs 26 and other core materials. The bridging members 32 extend between opposing ones of the webs 26 so that a single bridging element reinforces the edge bonded joints 27 on two adjacent webs 26.

The bridging members 32 may be made of a low density, high temperature material which may be high temperature foam, such as ceramic foams or fused filamentary materials such as the rigid foam insulation disclosed in U.S. Pat. No.

6,716,782 issued Apr. 6, 2004 and assigned to the Boeing Company. The rigid foam insulation described in this prior patent is a combination of ceramic fibers which are sintered together to form a low density, highly porous material with low thermal conductivity. This foam exhibits high tensile strength and good dimensional stability. The material forming the bridging members 32 should have an acceptable ratio of strength-to-density and should be suitable for being sheared by the web 26 so that hand fitting is not required. As used herein, "high temperature" material is generally intended to refer to temperatures above which polymeric materials may exhibit diminished capacity. The bridging members 26 may be made from materials other than a foam. For example, the bridging members 26 may be formed from a low density felt of sintered ceramic fibers.

As will be discussed in more detail below, in one embodiment, the bridging material may be seated in position by cutting through it with the shear carrying web 26 during the assembly process. Thus, the density of the bridging members 32 generally should be less than the density of web 26 and/or the facesheets 22, 24. However, bridging members 32 providing useful results may be formed from material having a density approaching that of the web 26, depending on the application and the loads to be carried by the web 26. Generally, the bridging material must be strong enough to carry the loads for the intended application, but sufficiently friable that the core 25 can be forced through it to form the joint geometry.

Figure 4:
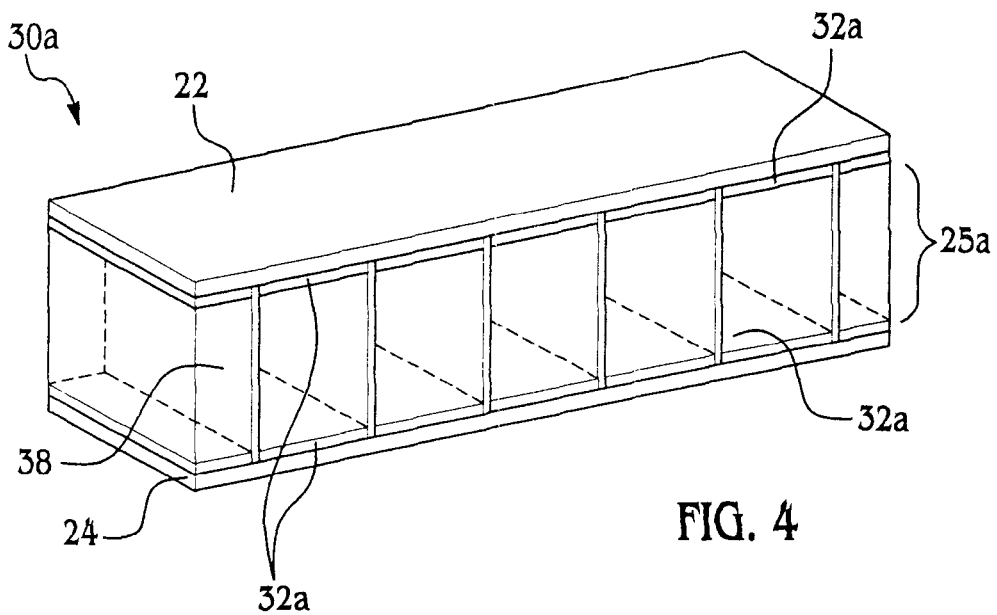
FIG. 4 is a perspective illustration similar to FIG. 2 but showing an alternate embodiment of the CMC structure employing a foam core.

FIG. 4 illustrates an alternate CMC construction 30a in which a filler material 38 is used to facilitate the fabrication process. During fabrication, after the layer 32a of bridging material is deposited, a layer of filler material 38 is then formed over the foam layer 32a, following which the web 26a or other grid core is forced through both the filler material layer 38 and the foam layer 32a. A second layer 32a of bridging material is then deposited over the filler material layer 38, following which the second facesheet 22 is applied. The filler material layer 38 may comprise high temperature, rigid foam which may have a density less than that of the bridging members 32. Depending on the strength-to-weight ratio requirements of the particular application, the foam filler material layer 38 may serve the purpose of bridging members 32, thus eliminating the need for the individual layers 32a of bridging material.

The filler material layer 38 acts as a spacer between the bridging members on the opposite facesheets 22, 24. The filler material may comprise low density or fugitive materials that are placed in the volume between bridging members 32. In some applications a relatively high thermal conductivity material may be chosen. Since the filler material layer 38 need not be bonded to surrounding materials, it need not be a ceramic or a material with a coefficient of thermal expansion close to that of the structural elements. It is also possible that the low density spacer layer 38 being used to facilitate the manufacturing process may be a fugitive material. Many materials sublimate at the high temperatures used for sintering ceramic matrix composites. These materials may be used as temporary tooling while building CMC structures. During the sintering phase of curing the CMC structure, the temporary element turns to gas and is vented out of the structure.

Figure 5:
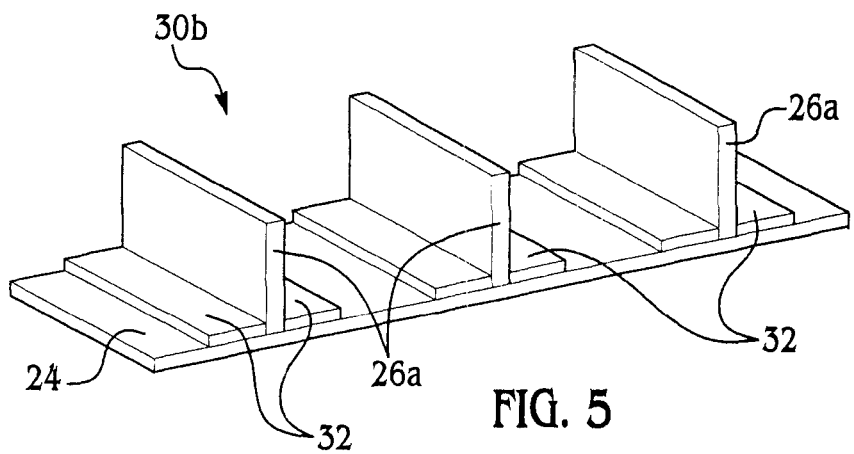
FIG. 5 is a perspective illustration of a further embodiment of the CMC structure.

FIG. 5 illustrates another embodiment of a CMC structure 30b in which relatively thick, stiffening ribs 26a form the core of the structure 30b. In this embodiment, the stiffening ribs are edge bonded to a single facesheet 24, or shell, to form a stiffened shell structure 30b. The facesheet 24 may comprise for example, the outer skin of an aerospace vehicle. The spacing between adjacent ribs 26a may be greater than the spacing of the webs 26 in the embodiments shown in FIGS. 1-4. In this embodiment, the bridging members 32 may not span the entire distance between adjacent ribs 26a, so that each rib 26a has an edge bonded joint reinforced by a pair of bridging members 32. Generally, the width of the bridging members 32 should be at least equal to or greater than their thickness in order to provide adequate reinforcement of the web 26a. Using bridging members 32 having a reduced width may reduce the weight of the structure 30b, which may be desirable in applications such as aircraft.

Figure 6:
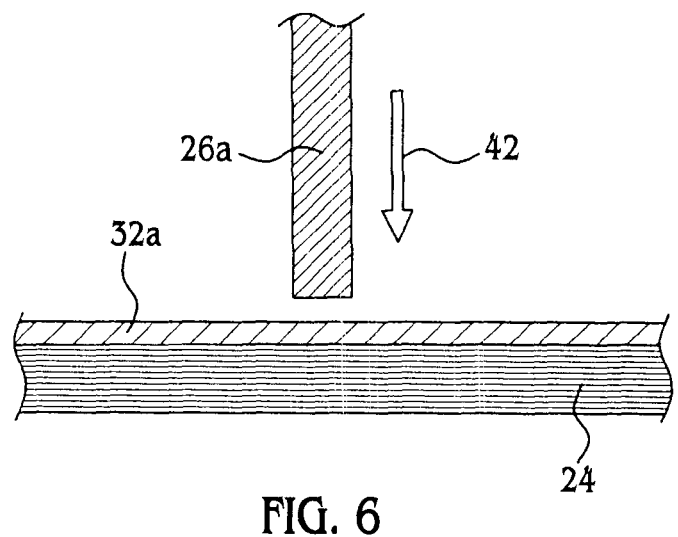
FIG. 6 is a sectional illustration of a web positioned to be forced through a layer of bridging material.
Figure 7:
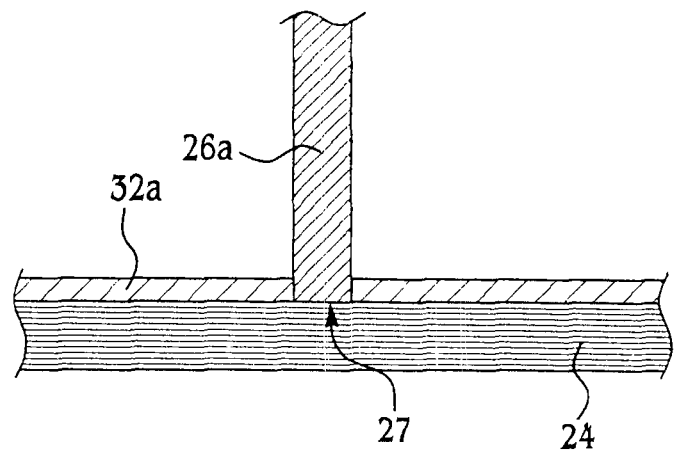
FIG. 7 is a sectional illustration similar to FIG. 6 but showing the web having penetrated the bridging material and edge bonded to the facesheet.

Reference is now made to FIGS. 6 and 7 which illustrate another embodiment in which the bridging members 32 are formed from a continuous layer of material such as high temperature rigid foam that is deposited and bonded to the inside face of each of the facesheets 22, 24. The material characteristics, including the density of the foam layer 32a should be such that it may be cut or penetrated by a web 26a during the fabrication process. The rigid foam layer 32a having been bonded to the facesheets 22, 24, the web 26a is then moved in the direction of the arrow 42 and is forced through the foam layer 32a until the corresponding facesheet 22, 24a is contacted to create an edge bonded joint.

With the web 26a edge bonded to a facesheet 24 at 27 as shown in FIG. 7, portions of the foam layer 32a abut the sides of the web 26a and thereby laterally reinforce the edge bonded joint 27 against shear loads. The use of a continuous layer 32a of rigid foam allows a wide variety of web geometries and shapes to be employed, including regular or irregular honeycomb configurations and grids since, during fabrication, the layer 32a of foam will conform to all sides of the web 26a, regardless of the web geometry.

The material used as the bridging members 32 should be bonded to both the adjacent facesheet and web. This may be done by wetting the joints with an appropriate slurry before curing the assembly. Other methods of forming the bridging members are possible. For example, a thin layer of bridging material may be bonded to a facesheet or a skin. Alternatively, a thick layer of bridging material maybe bonded to a facesheet or skin, following which the bridging material may be machined down to a final desired thickness. In another method, core material may be pressed into a sheet of bridging material to form a subassembly (held together only by friction), following which a facesheet or skin is bonded to the assembly.

Figure 9:
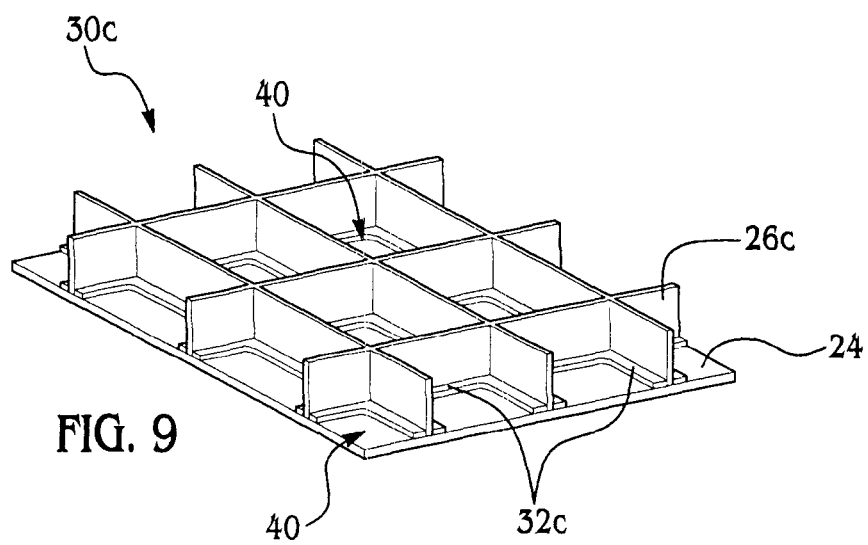
FIG. 9 is a perspective illustration of a CMC structure having an open pattern of stiffeners in which areas of the bridging material has been removed.

FIG. 9 illustrates a grid reinforced shell 30c in which a grid of stiffening ribs 26c are edge bonded to a facesheet 24 or other shell element. Reinforcing bridging members 32c cover the bond lines between the stiffening ribs 26c and the facesheet 24. The bridging members 32c may be formed by bonding a formed or cut piece of bridging material to the facesheet 24, and then removing portions of the material in central areas 40, as by machining, for example, in order to reduce the weight of the structure 30c. The remaining width of the bridging members 32c should be sufficient to carry the load for the particular application of the CMC structure 30c.

Figure 10:
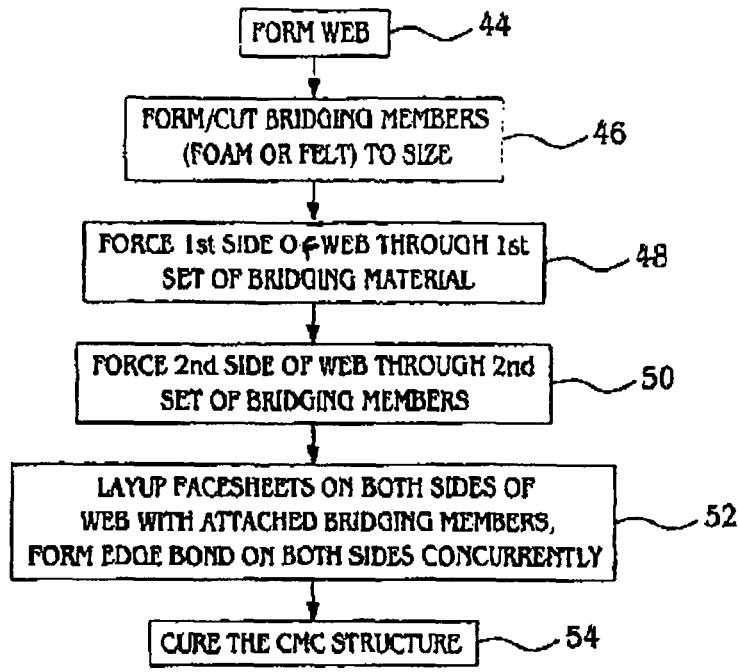
FIG. 10 is a block diagram illustrating one method of forming a CMC sandwich structure having a stiffened web.

FIG. 10 illustrates the basic steps of one method for fabricating a web stiffened CNC sandwich structure. First, at step 44, the web is formed, following which the bridging members 32 are formed or cut to size, as shown at step 46. Next, at step 48, a first side of the web is forced through a first set of bridging material, following which, at step 50, the second side of the web is forced through the second set of bridging members 32. Then, at step 52, the facesheets 22, 24 are laid up on the respective sides of the web with the attached bridging members, and the edges of the web are edge bonded to both facesheets, concurrently. Finally, at step 44, the assembled CMC structure is cured.

Figure 11:
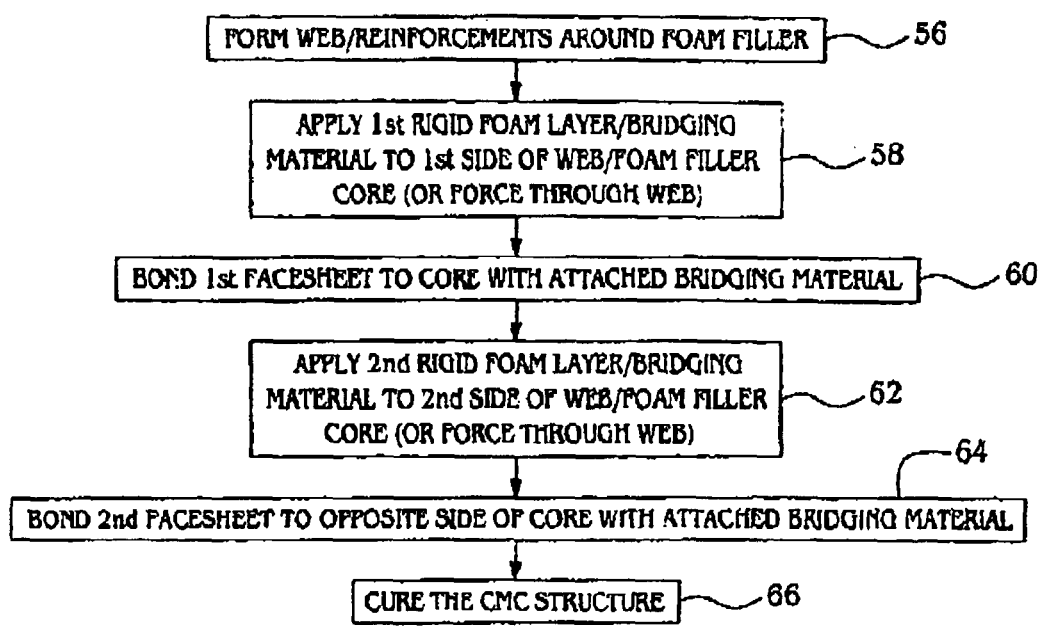
FIG. 11 is a block diagram illustrating another method for forming a CMC sandwich structure having a stiffened web.

An alternate method of fabricating a web stiffened CMC sandwich structure is shown in FIG. 11. First, at step 56, the web and reinforcements around the foam filler are formed. Next, at step 58, a first rigid foam layer and bridging material is applied to the first side of the first web and foam filler core (or forced through the web). Next, at step 60, the first facesheet is bonded to the core with the attached bridging material. At step 62, the second rigid foam layer and bridging material is applied to the second side of the combination of the web and foam filler core, or forced through the web. As shown at step 64, the second facesheet is then bonded to the opposite side of the core having the attached bridging material. Finally, step 66, the assembled CMC structure is cured.

Figure 12:
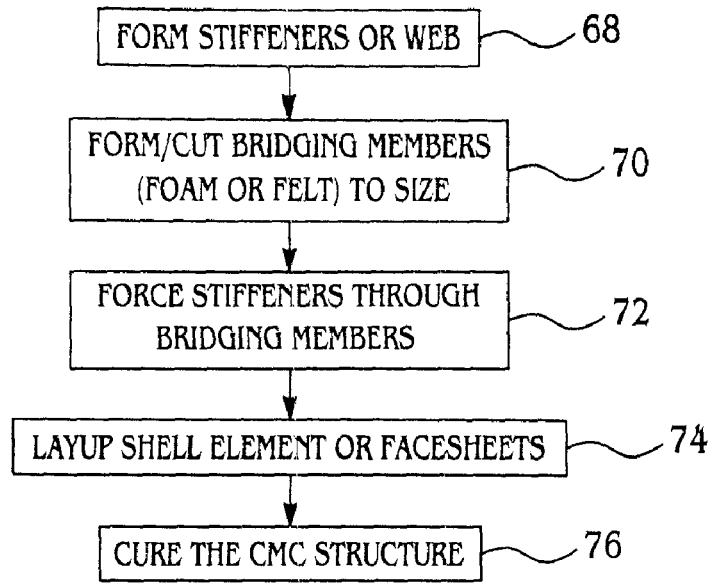
FIG. 12 is a block diagram illustrating one method for forming a rib-stiffened CMC shell structure.

FIG. 12 illustrates the steps of one method for fabricating a rib stiffened shell type CMC structure. The stiffeners or web are formed at step 68, following which the bridging members are formed or cut to size, as shown at step 70. Then, the stiffeners are forced through the bridging members as shown at step 72. At step 74, the shell element or facesheets are laid up, following which the assembled CMC structure is cured at step 76.

Figure 13:
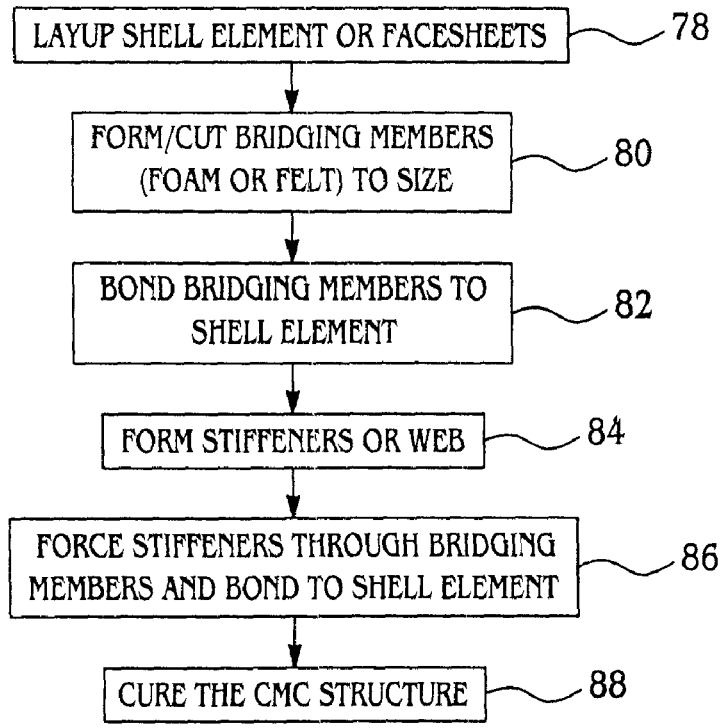
FIG. 13 is a block diagram illustrating another method for forming a rib-stiffened CMC shell structure.

FIG. 13 illustrates the steps of another method for fabricating a rib stiffened, shell type CMC structure. At step 78, the shell element or facesheets are laid up. Then, the bridging members are formed or cut to size at step 80. At step 82, the bridging members are bonded to the shell element (or facesheets). Next, at step 84, the stiffeners or web are formed. Then, at step 86, the stiffeners or web are forced through the bridging members and are edge bonded to the shell element. Finally, at step 88, the assembled CMC structure is cured.

Figure 14:
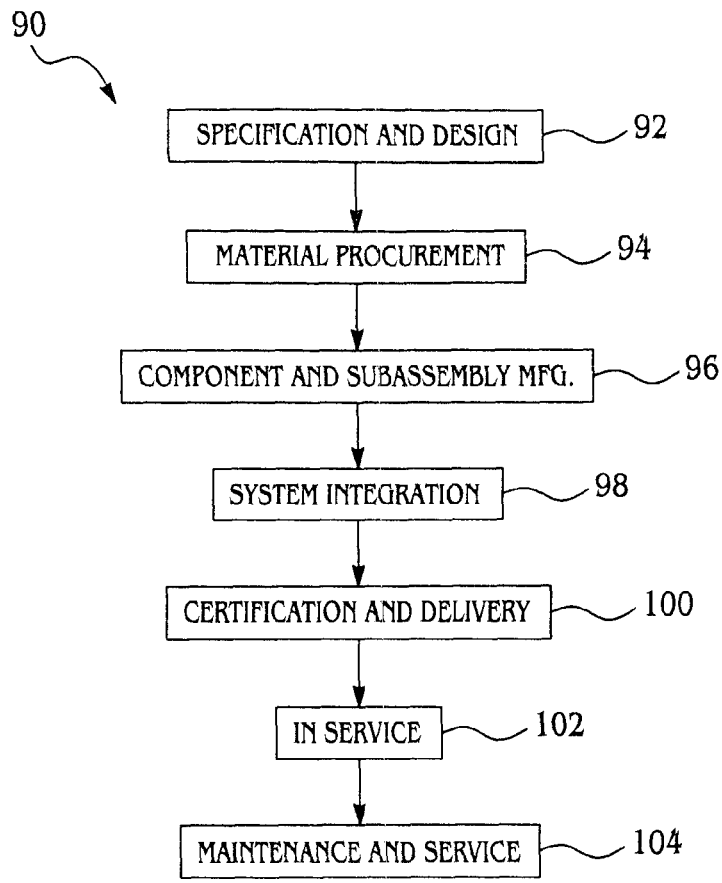
FIG. 14 is a flow diagram of an aircraft production and service methodology.
Figure 15:
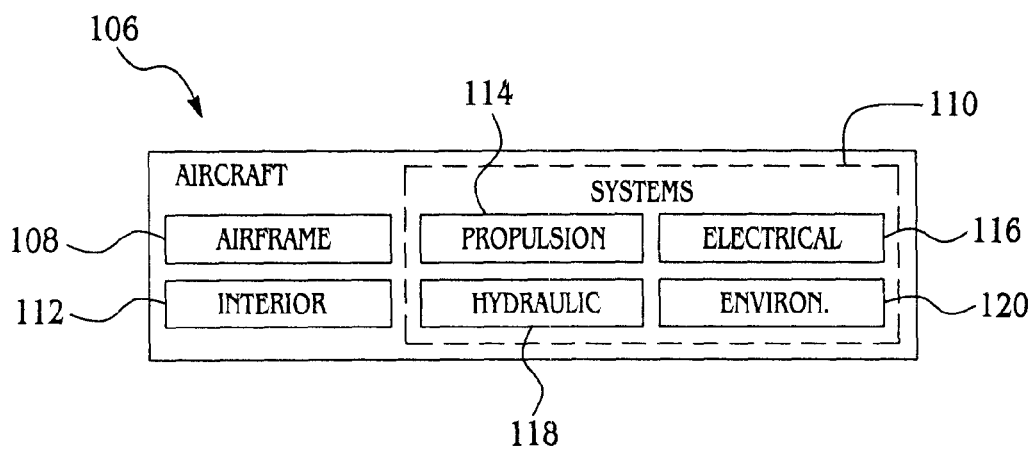
FIG. 15 is a block diagram of an aircraft.

The embodiments of the disclosure described above may be used in an aircraft manufacturing and service method 90 as shown in FIG. 14 and an aircraft 106 as shown in FIG. 15. During pre-production, exemplary method 90 may include specification and design 92 of the aircraft 106 and material procurement 94. During production, component and subassembly manufacturing 96 and system integration 98 of the aircraft 106 takes place. Thereafter, the aircraft 106 may go through certification and delivery 100 in order to be placed in service 102. While in service by a customer, the aircraft 106 is scheduled for routine maintenance and service 102 (which may include modification, reconfiguration, refurbishment, and so on).

Each of the processes of method 90 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 14, the aircraft 106 produced by exemplary method 90 may include an airframe 108 with a plurality of systems 96 and an interior 112. Examples of high-level systems 110 include one or more of a propulsion system 114, an electrical system 116, a hydraulic system 118 and an environmental system 120. Any number of other systems may be included. Although an aerospace example is shown, the principles of the invention may be applied to other industries, such as the automotive industry.

Structures and methods embodied herein may be employed during any one or more of the stages of the production and service method 90. For example, components or subassemblies corresponding to production process 90 may be fabricated or manufactured in a manner similar to components or subassemblies produced while the aircraft 106 is in service.

Also, one or more apparatus embodiments, method embodiments, or a combination thereof may be utilized during the production stages 96 and 98, for example, by substantially expediting assembly of or reducing the cost of an aircraft 106. Similarly, one or more of apparatus embodiments, method embodiments, or a combination thereof may be utilized while the aircraft 106 is in service, for example and without limitation, to maintenance and service 104.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of forming a ceramic matrix composite structure, comprising the steps of:
   (A) forming first and second substantially horizontall planar layers of bridging material comprising sintered ceramic fibers;
   (B) forcing a first end of a web through the first layer of bridging material to substantially penetrate said first layer of bridging material, said penetrated first layer comprising substantially horizontally planar end portions each having a substantially vertical wall abutting either side wall of said web adjacent said first web end;
   (C) forcing a second opposite end of the web through the second layer of bridging material to substantially penetrate said second layer of bridging material, said penetrated second layer comprising substantially horizontally planar end portions each having a substantially vertical wall abutting either side wall of said web adjacent said second web end;
   (D) applying first and second facesheets to respective said first and second ends of the web; and
   (E) bonding the first and second ends respectively to the first and second facesheets such that said substantially horizontally planar end portions cover bond lines formed by said bonding.

2. The method of claim 1, further comprising the step of:
   (F) bonding the first and second layers of bridging material respectively to the first and second facesheets.

3. The method of claim 1, step (E) includes bonding the first and second layers of bridging material to the first and second facesheets substantially concurrently.

4. The method of claim 1, further comprising the step of:
   (F) curing the ceramic matrix composite structure after step (E) has been completed.

5. The method of claim 1, further comprising the step of:
   (F) manufacturing aircraft subassemblies using the ceramic composite matrix composite structure.

6. A method of forming a ceramic matrix composite structure, comprising the steps of:
   (A) forming first and second layers of substantially horizontally planar bridging material comprising ceramic fibers;
   (B) forcing a first end of a web through the first layer of bridging material to substantially penetrate said first layer of bridging material, said penetrated first layer of bridging material comprising substantially horizontally planar end portions each having a substantially vertical wall abutting either side wall of said web adjacent said first web end;
   (C) forcing a second opposite end of the web through the second layer of bridging material to substantially penetrate said second layer of bridging material, said penetrated second layer of bridging material comprising substantially planar end portions each having a substantially vertical wall abutting either side wall of said web adjacent said second web end;
(D) contacting first and second ends to respective facesheets adjacent said respective first and second bridging layers; and
(E) bonding the first and second ends respectively to the respective first and second facesheets to form an edge bonded joint such that said substantially horizontally planar end portions cover bond lines formed by said bonding.

7. The method of claim 6, said respective bridging layers comprise a foam or a felt of sintered ceramic fibers having a lower density than said web.

8. The method of claim 6, further comprising the step of: curing the structure after steps (A) through (E) have been performed.

9. A method of forming a ceramic composite sandwich structure, comprising the steps of:
(A) forming structural stiffeners;
(B) forming substantially horizontally planar bridging members comprising sintered ceramic fibers for laterally reinforcing the stiffeners;
(C) forcing the ends of said stiffeners through the bridging members to substantially penetrate said bridging members, said penetrated bridging members respectively comprising substantially horizontally planar end portions each having a substantially vertical wall abutting either side wall of a respective stiffener adjacent a respective stiffener end;
(D) laying up a facesheet; and,
(E) bonding the facesheet to the combination of the ends of the stiffeners and the bridging members such that said substantially horizontally planar end portions cover bond lines formed between said stiffeners and said bridging members.

10. The method of claim 9, further comprising the step of:
(F) removing a portion of the bridging members after step (E) has been performed.

11. The method of claim 9,
said bridging members have a lower density than said stiffeners.

12. The method of claim 9, further comprising the step of:
(F) curing the ceramic composite sandwich structure.

13. The method of claim 9, further comprising the step of
(F) manufacturing aircraft subassemblies using the ceramic composite sandwich structure.

* * * * *